United States Patent
Ernst

(10) Patent No.: US 12,522,998 B1
(45) Date of Patent: Jan. 13, 2026

(54) LAMP POST COLUMN COVER SYSTEM AND METHOD OF COVERING A LAMP POST COLUMN

(71) Applicant: Randy Ernst, Thousand Palms, CA (US)

(72) Inventor: Randy Ernst, Thousand Palms, CA (US)

( * ) Notice: Subject to any disclaimer, the term of this patent is extended or adjusted under 35 U.S.C. 154(b) by 0 days.

(21) Appl. No.: 18/787,059

(22) Filed: Jul. 29, 2024

Related U.S. Application Data

(60) Provisional application No. 63/529,497, filed on Jul. 28, 2023.

(51) Int. Cl.
*E04H 12/00* (2006.01)
*E02D 31/00* (2006.01)

(52) U.S. Cl.
CPC ............ *E02D 31/00* (2013.01); *E04H 12/00* (2013.01)

(58) Field of Classification Search
CPC ............ E04H 12/2292; E04H 12/2238; E01F 15/0469; E01F 15/141; E04C 3/30
See application file for complete search history.

(56) References Cited

U.S. PATENT DOCUMENTS

| | | | | |
|---|---|---|---|---|
| 1,489,204 A * | 4/1924 | Glen | | 52/297 |
| 1,776,682 A * | 9/1930 | King | | E04H 12/2261 174/45 R |
| 5,611,173 A * | 3/1997 | Headrick | | E06B 1/70 49/467 |
| 5,832,675 A * | 11/1998 | Zuares | | E04H 12/2292 52/60 |
| 6,869,058 B2 * | 3/2005 | Tung | | E04H 12/2238 248/910 |
| D520,145 S * | 5/2006 | Boyd | | D25/38.1 |
| 7,219,873 B2 * | 5/2007 | Harwood | | E04H 12/2261 181/171 |
| 7,470,091 B2 * | 12/2008 | Scholl | | E02D 27/42 52/297 |
| 7,896,307 B2 * | 3/2011 | Berg | | G09F 23/00 248/519 |
| 8,720,091 B1 * | 5/2014 | Snyder | | G09F 15/02 40/607.01 |
| 9,404,230 B2 * | 8/2016 | Habodasz | | E01D 19/08 |
| 10,480,207 B1 * | 11/2019 | Webster | | E04H 12/2292 |
| 2005/0102925 A1 * | 5/2005 | Boyd | | E04H 12/2269 52/169.9 |

(Continued)

*Primary Examiner* — Brian E Glessner
*Assistant Examiner* — Daniel J Kenny
(74) *Attorney, Agent, or Firm* — Invention To Patent Services; Alex Hobson

(57) ABSTRACT

A lamp post column cover is configured for placement around a lamp post to produce a sloped cover extension to prevent trash from being placed on the lamp post column. The lamp post column cover has a post opening around the top of the lamp post column cover and configured around the lamp post a height above the top of the lamp post column. A post opening flange extends vertically around the post opening and is coupled with the cover extension that extends at an extension angle down towards the column flange or base of the lamp post column cover. A plurality of drainage ports are configured along the base of the lamp post column cover and have a drainage port flange extending over the drainage port. The drainage port flange may extend out from the cover extension or from the drainage step of the lamp post column cover.

9 Claims, 12 Drawing Sheets

(56) References Cited

U.S. PATENT DOCUMENTS

| | | | | |
|---|---|---|---|---|
| 2007/0116515 A1* | 5/2007 | Woytowich | ........... | E01F 15/141 |
| | | | | 404/8 |
| 2012/0212883 A1* | 8/2012 | Hargreaves | .............. | H05K 5/04 |
| | | | | 361/679.01 |
| 2013/0042547 A1* | 2/2013 | Carhart | ............... | E04H 12/2292 |
| | | | | 52/169.13 |

* cited by examiner

LAMP POST COLUMN COVER SYSTEM AND METHOD OF COVERING A LAMP POST COLUMN

CROSS REFERENCE TO RELATED APPLICATIONS

This application claims the benefit of priority to U.S. provisional patent application No. 63/529,497, filed on Jul. 28, 2023; the entirety of which is hereby incorporated by reference herein.

BACKGROUND OF THE INVENTION

Field of the Invention

The invention relates to a lamp post column system employing a lamp post column cover assembly that produces a sloped surface extending over the top of the column to the post to prevent placement of items on the lamp post column.

Background

Parking lots, parks, walkways, sidewalks and other public places often have lamp posts that extend up from a lamp post column, such as a cement cylindrical to support the lamp post in position. These lamp post columns are typically much larger in diameter than the lamp post and the top of the column is typically flat; providing a surface for people to place items thereon. In parking lots, people often place trash, such as fast-food cups, food containers, bags and the like on the top of the lamp post column. This attracts birds and other animals which further causes problems as the trash gets spread around the parking lot.

SUMMARY OF THE INVENTION

The invention is directed to an exemplary lamp post column cap system configured for placement around a lamp post to produce a sloped cover extension to prevent trash from being placed on the lamp post column and to divert water from collecting and remaining around the lamp post. The column cap of the lamp post cover assembly forms a post opening configured to extend around the lamp post a height above the top of the lamp post column. A post flange extends to the lamp post and may extend vertically around the post opening. A cover extension extends at an extension angle from the post flange down towards the base flange or base of the column cap. An exemplary lamp post column cap system may also include a column flange component and a column sleeve component. The column sleeve may extend around the lamp post column and the column flange may extend around the top outer perimeter of the lamp post column and over the column sleeve. The column flange may extend down a column flange length. The column cap may have drainage for water to drain out from the interior of the column cap to prevent rusting of the lamp post. The column cap may have column feet that produce a drainage gap. A column cap may have a drainage step that extends down from the cover extension to the base flange. A plurality of drainage ports may be configured along the base of the column cap and have a drainage port flange extending over the drainage port. The drainage port flange may extend out from the cover extension or from the drainage step of the column cap.

The cover extension may extend at an extension angle that is effective to prevent trash and items from being placed therein. The extension angle from horizontal may be large enough to cause items to slide off when placed thereon and may be about 30 degrees or more, about 45 degrees or more, about 55 degrees or more, about 65 degrees or more or even 75 degrees or more. The greater the angle, the greater the height of the column cap.

The outside diameter of the column flange or the base of column cap may be about the same as the diameter of the lamp post column, or about 25 cm or more, about 40 cm or more, about 50 cm or more, about 75 cm or more, about 1 m or more and any range between and including the lengths provided. A cap flange offset distance or a difference in the diameter of the base of the column cap and the diameter of the top of lamp post column may be effectively small to prevent items from being placed on this edge, and may be about 8 cm or less, about 6 cm or less, about 4 cm or less, about 2 cm or less and any range between and including the values provide; smaller is better to prevent even small items from being placed on the top of the lamp post column edge.

A plurality of drainage ports may be configured along the base of the column cap and provide an opening between the column cap and the top of the lamp post column for water and condensation to drain out. The drainage ports may have a drainage port flange, a cover extending over the drainage ports. An exemplary column cap may have two or more, three or more, four or more, six or more or event eight or more drainage ports and the drainage ports may be uniformly arranged about the perimeter of the base. An exemplary column cap is configured with eight drainage ports are arranged uniformly, or at 45 degree offsets from each other, around the perimeter. The drainage step, and drainage port may extend a height from the base of the column cap of about 5 mm or more, about 10 mm or more, about 1 cm or more, about 2 cm or less and any range between and including the height values provided. The width of the drainage port may be about 5 mm or more, about 10 mm or more, about 1 cm or more, about 2 cm or more and any range between and including the width values provided.

The height of an exemplary column cap may be about 10 cm or more, about 12 cm or more, about 16 cm or more, about 20 cm or more, about 25 cm or more and any range between and including the values provide. The height will depend on the extension angle and the base diameter of the column cap.

An exemplary column cap may be made out of a material that is rigid to hold a shape and be durable, but also capable of being deformed about the spit for placement of the column cap around the lamp post and over the lamp post column. A preferred material is plastic, such as polyester, polypropylene, polyethylene and the like. The plastic may include ultraviolet inhibitors to protect the plastic from degradation in the sun. Also, the plastic may include a pigment or color and this color may go along with the color scheme for the parking lot and business of the parking lot, such as red for "Target", as an example. An exemplary column cap, column sleeve and column flange may all be made from a sheet of plastic and the design may enable molding from a single sheet of plastic.

An exemplary column cap may be configured on top of a lamp post column and around a lamp post by producing a split in column cap from the post opening to the outer perimeter in the base of the column cap, such that the split can be opened up starting preferably at the base, or along the outer perimeter and configured around the lamp post. The lamp post may be forced through the split, such as a cut or slit in the column cap from the outer perimeter along the base to the post opening. The column cap may then be forced or slid down along the lamp post, with the lamp post in the post opening, down on top of the top of the lamp post column. The base may rest on the top of the lamp post column. The split may be reduced wherein the lamp post column is resilient and can be stretched or flexed about the split to enable insertion of the lamp post through the split.

An exemplary lamp post column cap is a resilient material that is configured to open up along the split to allow a lamp post to move the lamp post through the split from the outer perimeter along the base to the post opening and then return to an original shape. The split may open in width 500% or more, about 1,000% or more, about 2,000% percent or more. For example, the split may have a width of about 5 mm or less and then expand to accommodate a lamp post that has a diameter of about 100 mm or more, or about 1000% wherein 10 mm would be 100% expansion of the width. Put another way, the width may expand from 10 mm or less, preferably 25 mm or less, to at least 100 mm with the column cap returning to an original shape with the split being enlarged no more than about 50% of an original width, wherein a 25 mm split is no more than 32.5 mm after lamp post insertion.

An exemplary lamp post column cap system includes a column sleeve, a column flange and a column cap. The column sleeve extends around the lamp post column and may have a column sleeve split for configuring, such as by wrapping, the column sleeve around the lamp post column. The sleeve split may extend from a base of the column sleeve to a top of the column sleeve, preferably along a line. Most columns have a circular outer perimeter and the column sleeve may be cylindrical in shape and be a thin sheet of material, such as plastic that can be opened and configured around the lamp post column.

A column flange has a cap flange extension that extends over the top of the lamp post column, under the column cap, and a column flange extension that extends down over the column sleeve. The column flange will direct water flowing off the column cap over the column sleeve. A column flange may also have a cap flange the extends up from the cap flange extension along and inner perimeter of the column flange. A column flange may have a split that separates the column flange for configuring the column flange around and over the top of the lamp post column.

A column cap has a cover extension extending at an extension angle up to the post flange. The post flange extends toward the lamp post. The column cap is configured a cap flange-offset distance from the outside perimeter of the column flange or from the column flange extension. The cap flange-offset distance may be about 5 mm or more, about 10 mm or more, about 15 mm or more, about 25 mm or more, about 30 mm or less, about 25 mm or less, and any range between and including the cap flange-offset distances provided. This cap flange-offset distance may be small to prevent people from placing trash on this horizontal surface. The column cap has a plurality of cap feet that extend down and rest on the cap flange extension of the column flange to produce a drainage gap having a drainage gap height for allowing water to flow out over the cap flange extension of the column flange and over the column sleeve. The drainage gap height may be about 2 mm or more, about 4 mm or more, about 5 mm or more, about 8 mm or even 10 mm or more and any range between and including the drainage gap heights provided. The drainage gap height may be kept small to prevent people from stuffing trash therein. A column cap may have a split extending from an inner perimeter to and outer perimeter, preferably along a line, to enable the column cap to be opened and configured around a lamp post.

A method of installing the lamp post column cap system includes first configuring the column sleeve around the lamp post column. Then the column flange is configured around the top of the lamp post column. The column cap 80 is then configured over the column flange and is secured by fasteners, such as screws 39 into the lamp post column. The column cap may have fastener aperture for receiving the fasteners therethrough. The fasteners will extend through the column cap 80, and into the column flange 70. The fasteners may extend into the column and the fasteners may be concrete anchor screws.

A column flange has a cover extension, the portion of the column flange that extends over the top of the lamp post column and post extension that extends along an interior perimeter of the column flange toward or along the lamp post. The column cap extends over the column flange. A fastener may extend through the column cap and into the column flange to secure these two portions of the lamp post column cap assembly together.

A column sleeve of the lamp post column cap system may be cylindrical in shape to extend around the lamp post column. The column sleeve extends a height from a base to a top and has a diameter. The column sleeve has an inside surface configured to extend over the lamp post column and an outside surface configured to be exposed.

An exemplary column flange has a rain flange that extends up from the cap flange extension and a column flange that extends down from the cap flange extension. The rain flange extends up a rain flange height to prevent precipitation from flowing in over the top of the lamp post column, and the cap flange extension extends a cap flange extension length between the rain flange and the column flange extension. The column flange has an inside diameter and an outside diameter. The column flange forms an aperture and may have a column flange split to enable the column flange to be configured over a lamp post column and around the lamp post.

An exemplary column cap of the lamp post column cap system may be configured as two column cap components. The two column cap components may be the same design, having the same shape and features. Each of the column cap components have a coupling flange configured to extend under opposing column cap component to couple together the two column cap components. Each of the two column cap components extend half a circle or 180 degrees along a radius, or between about 170 degrees and 190 degrees. Each column cap component has cap feet that extend down to form the drainage gap. A cap foot may include a fastener aperture for receiving a fastener, such as a screw, therethrough. Also, each cap foot may be formed by a foot recess from the cover extension, which enables the column cap component to be molded from a single sheet of material, wherein the column cap component is a contiguous planar sheet of material, such as a plastic sheet. The cover extension extends along an extension angle from a horizontal axis. A post flange extends along a concave post extension that extends along a radius of curvature that is configured to conform to the diameter of the post. The foot extension extends a drainage gap height.

The summary of the invention is provided as a general introduction to some of the embodiments of the invention and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
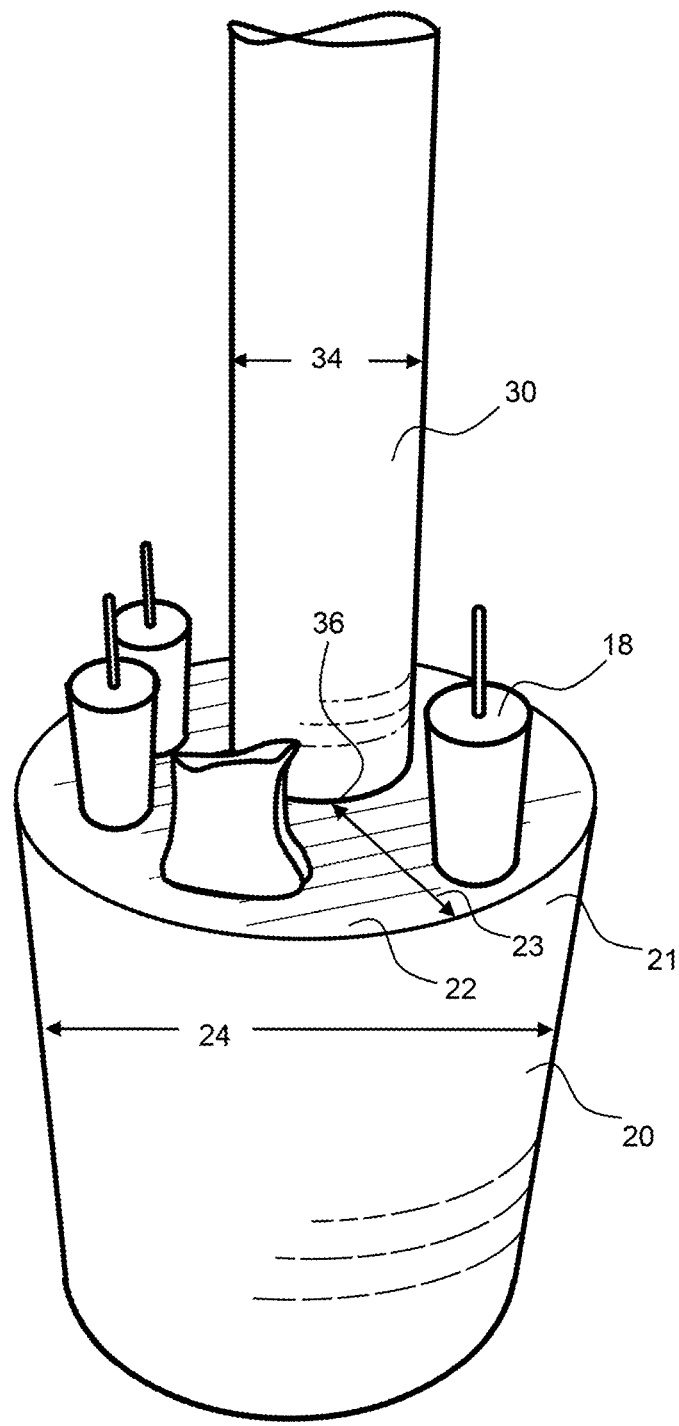
FIG. 1 shows a perspective view of a lamp post column and lamp post extending therefrom with trash resting on the top of the lamp post column.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

As shown in FIG. 1, a lamp post column 20 supports a lamp post 30 that extends up from the top 22 of the lamp post column. The top of the lamp post column is flat and extends horizontally providing a location for people to place trash 18, such as fast-food beverage containers, food packaging and bags. As detailed herein, the trash attracts birds and animals that results in the trash being spread around the area. This is unattractive and cost money in employee time for cleanup.

The lamp post 30 has a lamp post diameter 34 that is much smaller than the lamp post column diameter 24. As described herein, the top 22 of the lamp post column produces a horizontal surface having a length 23 from the lamp post 30, or lamp post column intersection 36, to the outside perimeter 21 of the top of the lamp post column 20, which may be about 10 cm or more, about 12 cm or more, about 15 cm or more, about 20 cm or more, about 25 cm or more, about 30 cm or more and any range between and including the lengths provided. The lamp post 30 intersects with the lamp post column 20 at a lamp post column intersection 36. The lamp post column 20 has a height 27 from the ground surface 25 to the top 22 of the lamp post column and this height may be about 0.5 m or more, about 0.7 m or more, about 1 m or more, about 1.25 m or more, about 1.5 m or less and any range between and including the height values provided.

Figure 2:
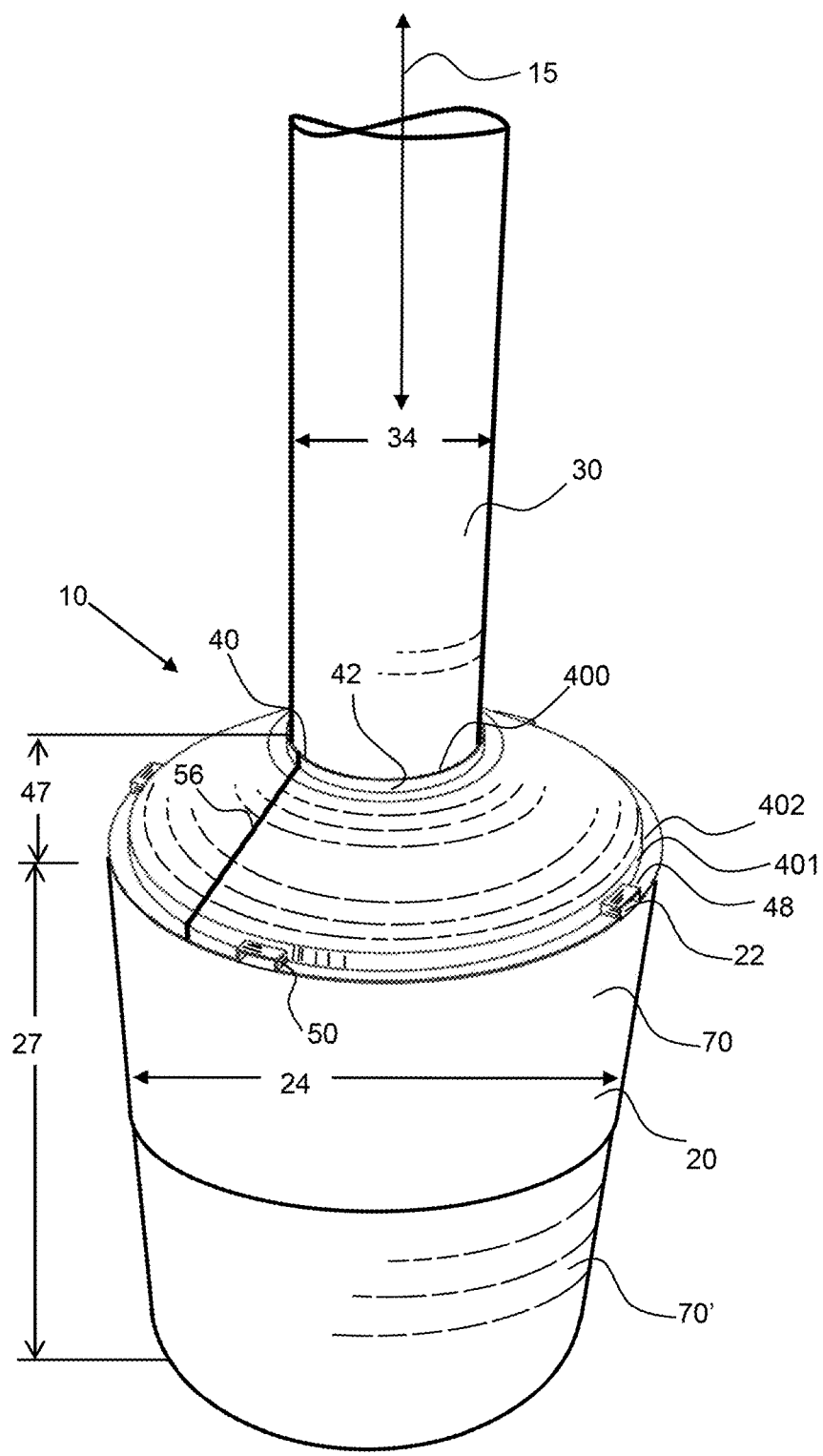
FIG. 2 shows a perspective view of a lamp post column with an exemplary column cap configured around the lamp post to produce a sloped cover extension to prevent trash from being placed on the lamp post column.

As shown in FIG. 2, the lamp post column 20 is configured with an exemplary column cap 10 configured around the lamp post 30 to produce a sloped cover extension 44 to prevent trash from being placed on the lamp post column. The column cap has a post opening 40 around the top 400 of the column cap 10 and configured around the lamp post 30 a height 47 above the top 22 of the lamp post column 20.

A post opening flange 42 extends vertically around the post opening and is coupled with the cover extension 44 that extends at an extension angle down towards the base flange 48 or base 402 of the column cap 10. The base 402 is configured to rest on the top 22 of the lamp post column 20. A drainage step 45 extends down from the cover extension 44 to the base flange 48. A plurality of drainage ports 50 are configured along the base 402 of the column cap 10 and have a drainage port flange 52 extending over the drainage port 50. The drainage port flange may extend out from the cover extension or from the drainage step 45 of the column cap 10.

The column cap 10 has a split 56 that extends from the top 400 to the base 402 that enables the column cap to be configured around the lamp post 30 and over the lamp post column 20 by prying open the column cap and placement of the lamp post 30 through the opened split 56. The lamp post may be first inserted along the split at the base 402 and then forced up along the split to the post opening 40 in the top 400 of the column cap 10.

Figure 3:
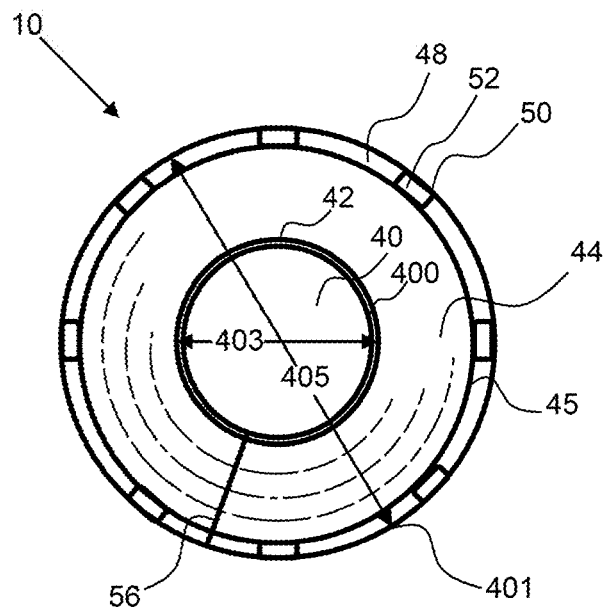
FIG. 3 shows a top view of an exemplary column cap having a post opening to extend around the lamp post and a cover extension extending at a cover extension angle down towards the base of the column cap.
Figure 4:
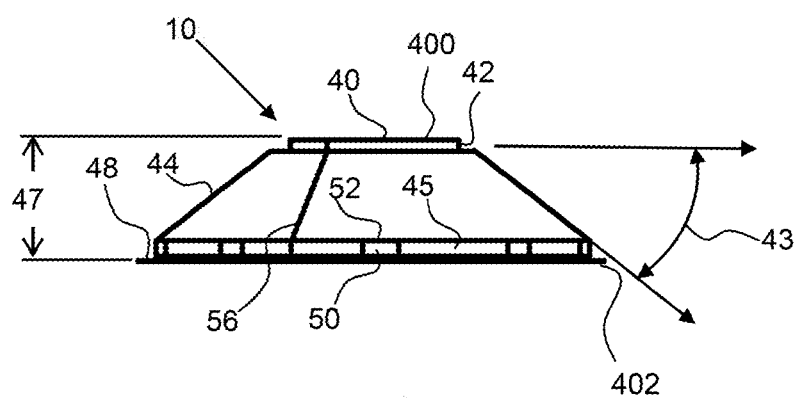
FIG. 4 shows a side view of exemplary column cap having a post opening to extend around the lamp post and a cover extension extending at a cover extension down to the base flange.

Referring now to FIGS. 3 and 4, an exemplary column cap 10 has a post opening 40 configured to extend around the lamp post and a cover extension 44 extending at an extension angle 43 down toward the base 402 of the column cap 10. The extension angle as shown is about 45 degrees. The post opening flange 42 extends vertically up from the cover extension 44 to the top 400 of the column cap 10. The column cap 10 has a height from the base 402 to the top 400 and a diameter 405 across the base and diameter 403 across the post opening 40.

The cover extension 44 extends down to the drainage step 45, a vertical extension from the cover extension down to the base 402 or bottom of the column cap 10. A plurality of drainage ports 50 are configured along the base of the column cap 10 and provide an opening between the column cap and the top 22 of the lamp post column 20 for water and condensation to drain out. The drainage ports may have a drainage port flange 52, a cover extending over the drainage ports 50. An exemplary column cap 10 may have two or more, three or more, four or more, six or more or even eight or more drainage ports and the drainage ports may be uniformly arranged about the perimeter 401 of the base. As shown, eight drainage ports 50 are arranged uniformly, or at 45 degree offsets from each other, around the perimeter 401.

Figure 5:
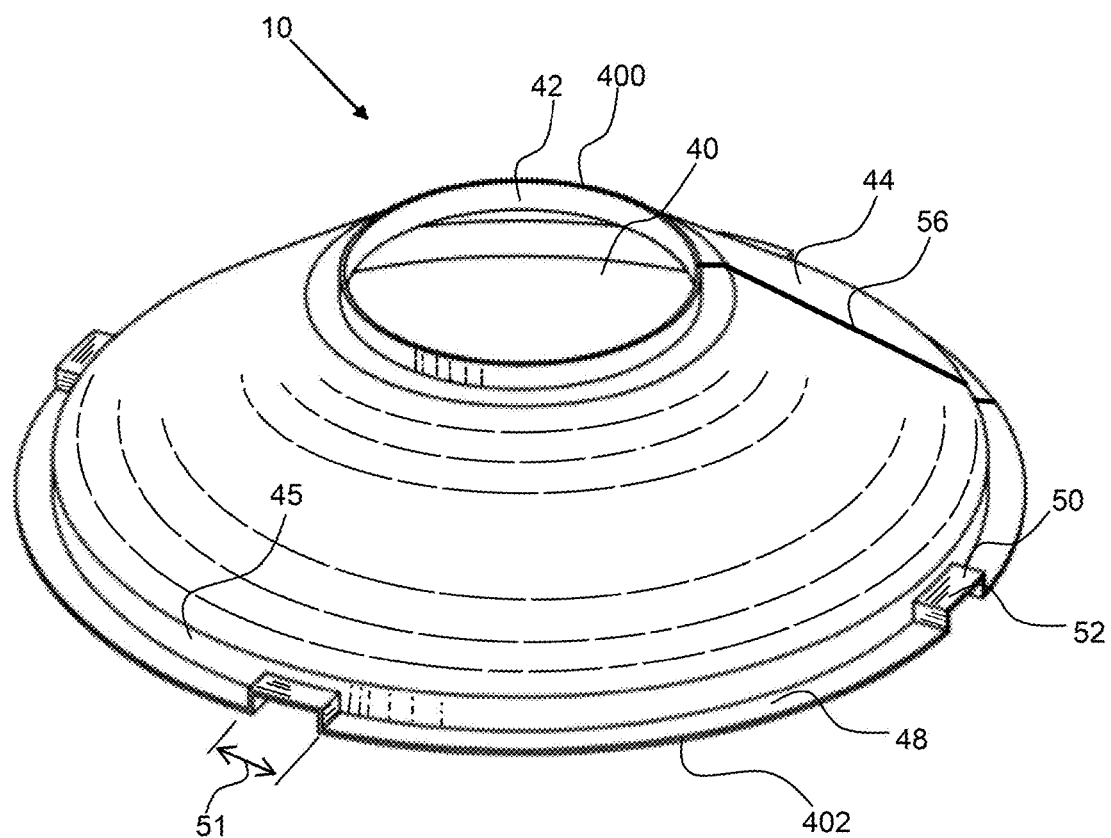
FIG. 5 shows a perspective view of an exemplary column cap having four drainage ports configured uniformly around the outer perimeter at 90 degree offset angles from each other.
Figure 6:
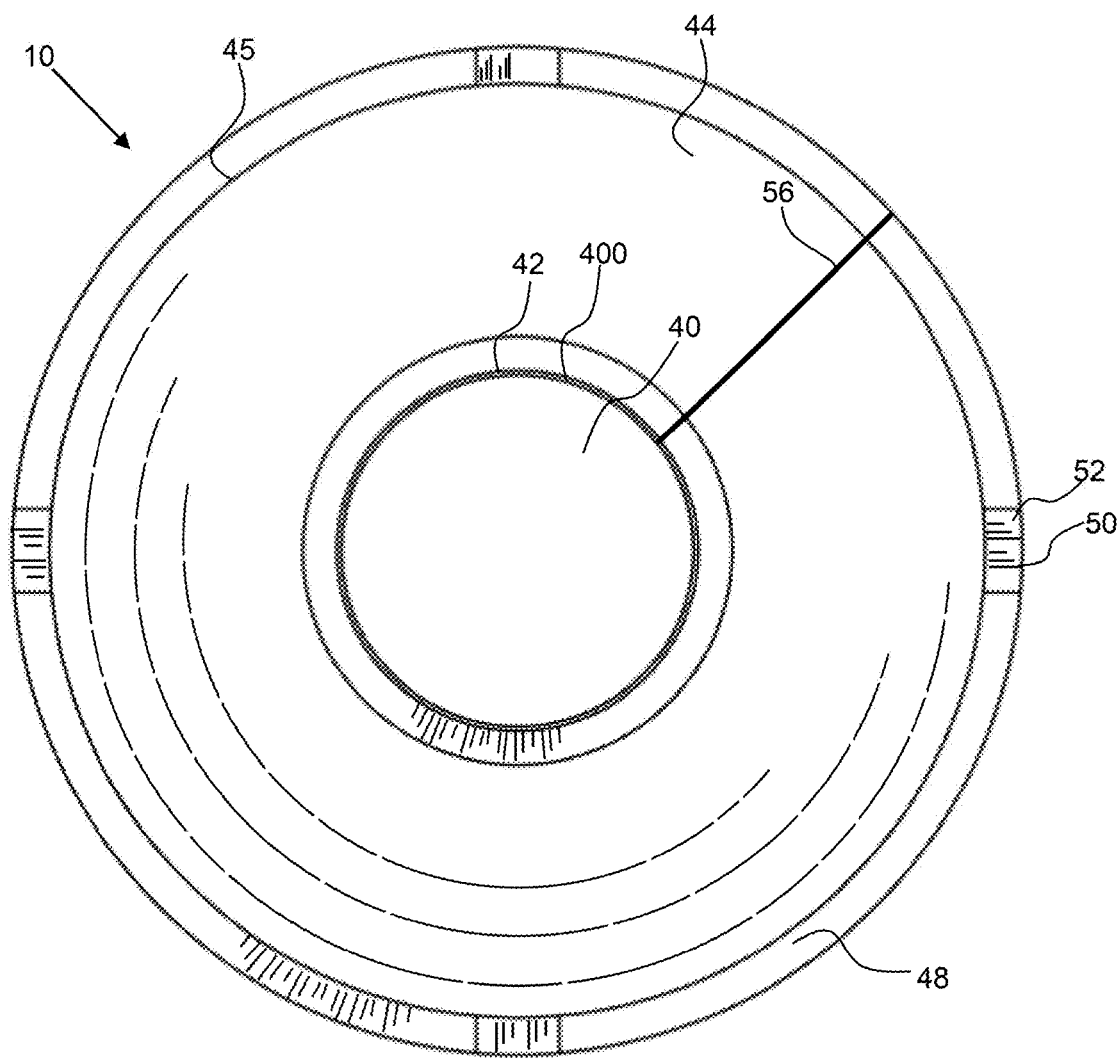
FIG. 6 shows a top view of the exemplary column cap shown in FIG. 5.
Figure 7:
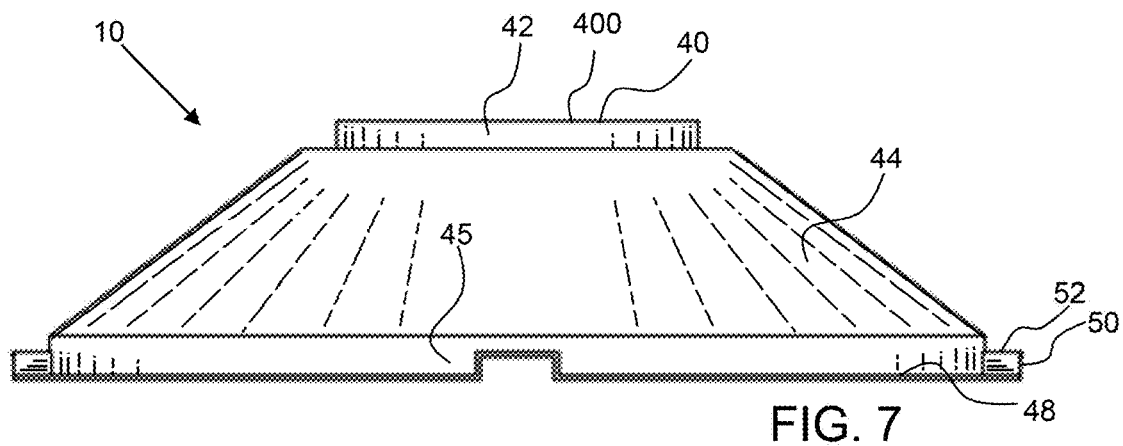
FIG. 7 shows a front view of the exemplary column cap shown in FIG. 5.
Figure 8:
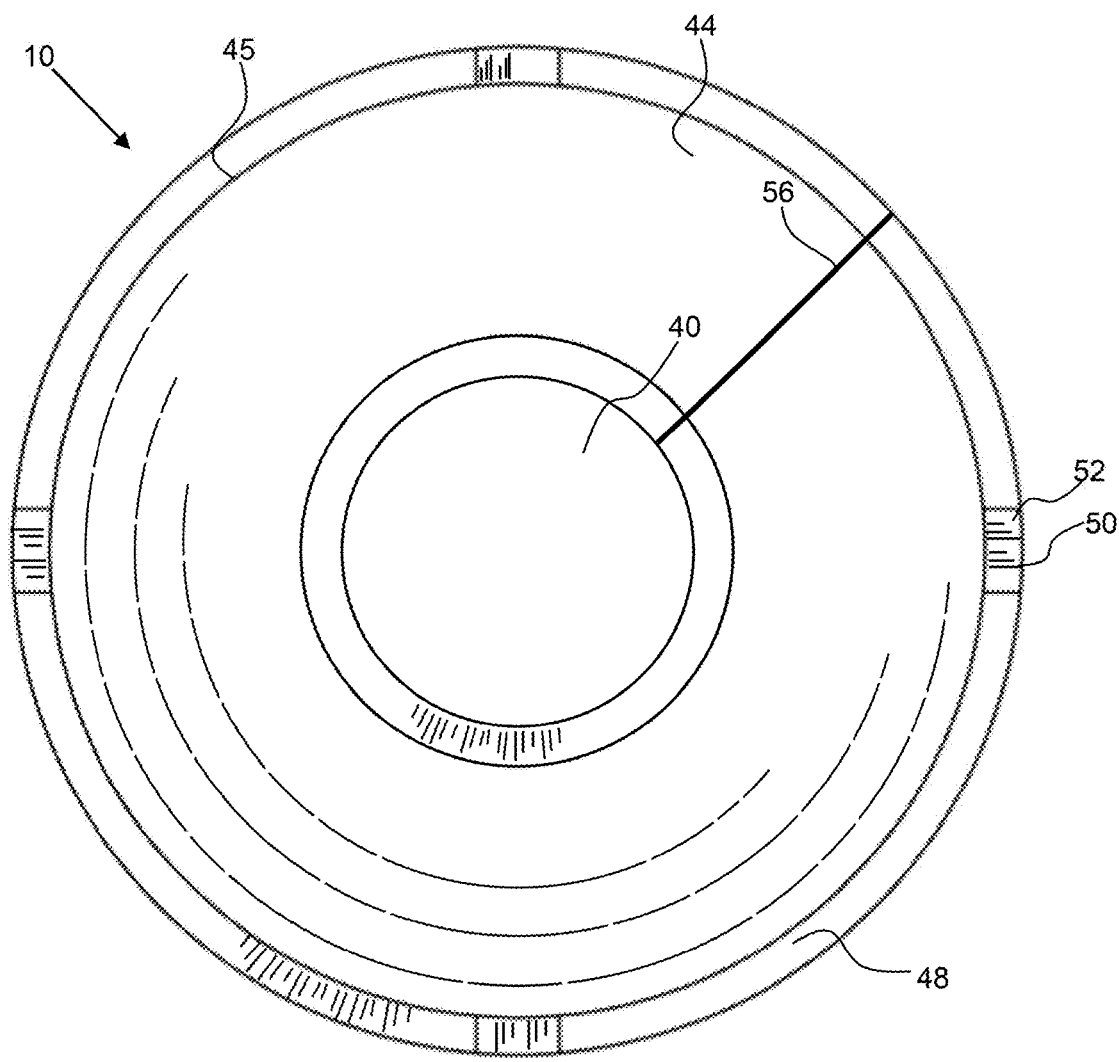
FIG. 8 shows a bottom view of the exemplary column cap shown in FIG. 5.
Figure 9:
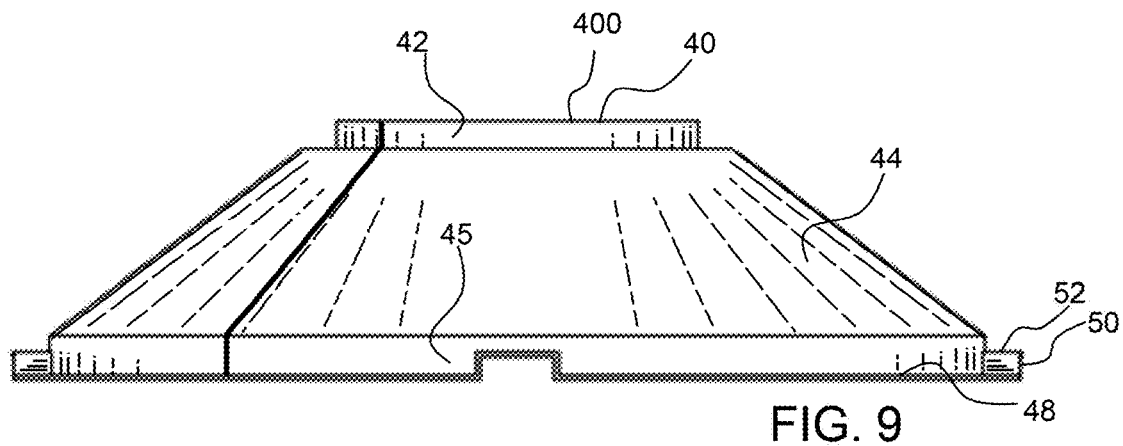
FIG. 9 shows a back view of the exemplary column cap shown in FIG. 5.

Referring now to FIGS. 5 to 9, an exemplary column cap 10 has four drainage ports 50 shown in FIG. 5. Each drainage port 50 has a drainage port flange 52. There are four drainage ports 50 in this embodiment, and they are uniformly configured around the perimeter of the column cap, or at 90 degree offsets from each other. A post opening 40 is configured in the top 400 of the lamp post column 10 and a post opening flange 42 extends vertically up along the post opening. The drainage port has a drainage port length 51 as shown in FIG. 5, and a height up from the base 402 to the drainage port flange 52.

Figure 10:
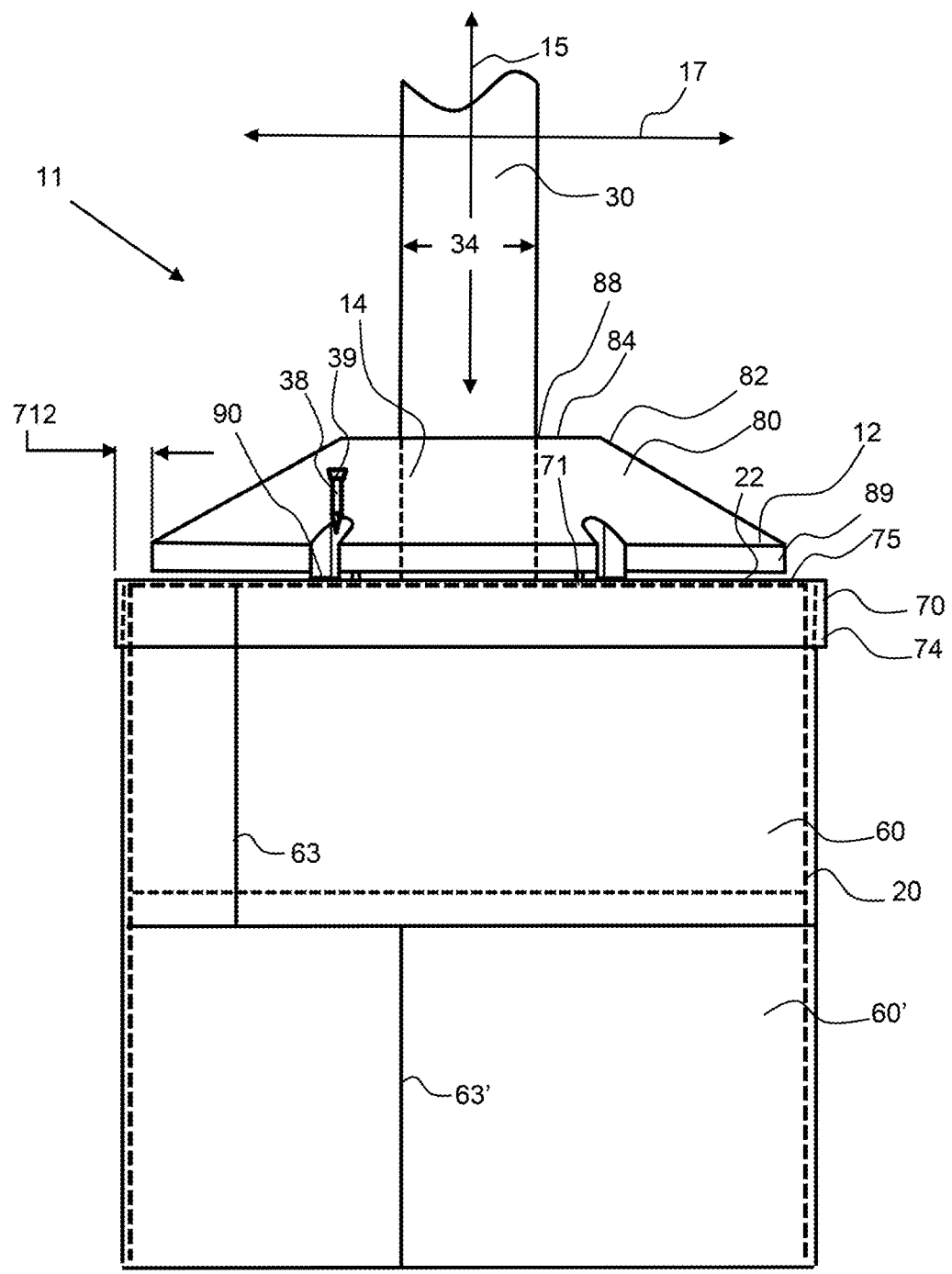
FIG. 10 shows a side view of a lamp post column cap system including a column sleeve, a column flange and a column cap.
Figure 11:
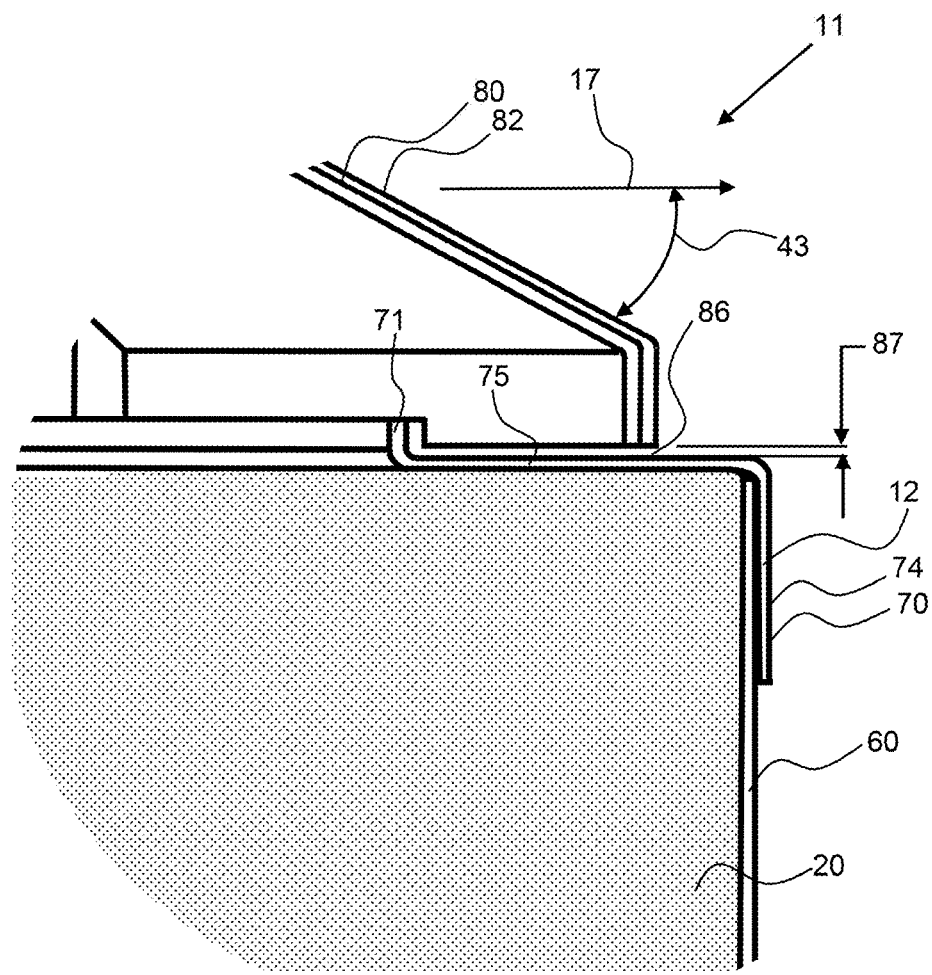
FIG. 11 shows a cross sectional view of a top corner of a lamp post column with the lamp post column cap system configured thereon.

The column cap 10 shown in FIGS. 2 to 9 maybe used in a lamp post column cap assembly 12, as shown in FIGS. 10 and 11 and extend over a column flange 70 and include a column sleeve 60 configured around the lamp post column 20.

Referring now to FIGS. 10 to 19, an exemplary lamp post column cap system 11 includes a column sleeve 60, a column flange 70 and a column cap 80 forming a lamp post column cap assembly 12. The lamp post column cap assembly 12 covers the column top and a portion of the lamp post 30 to prevent precipitation from collecting in and around the lamp post, lamp post column 20 intersection. The post flange 84 of the column cap 80 may extend around the lamp post and have a small gap, or post opening space between the post flange and the outer perimeter of the lamp post 30 such as no more than about 30 mm, about 25 mm or less, about 20 mm or less, and preferably about 15 mm or less, 10 mm or less, or even 5 mm or 3 mm or less and any range between and including the values provided. A rain flange 71 extends up along the inside perimeter of the column flange and prevents blowing rain and precipitation from flowing in and collecting along the base of the lamp post. Also, a drainage gap 86 shown in FIG. 11 enables any moisture on the column flange 70 to dry out and/or flow off of the column flange and down over the column sleeve 60.

Figure 19:
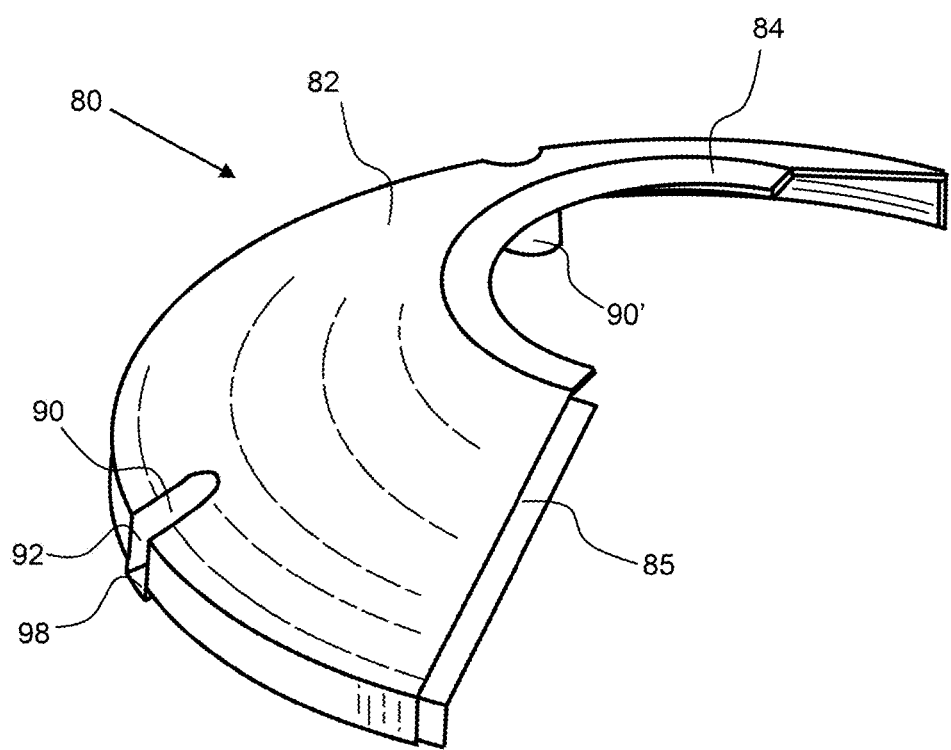
FIG. 19 shows a top perspective view of the column cap of the lamp post column cap system.

As shown in FIG. 10 a pair of column sleeves 60, 60' extend around the lamp post column 20 to cover the lamp post column 20 with a first column sleeve 60 extending over the second column sleeve 60' column sleeve. There may be an overlap of the first column sleeve over the second column sleeve to ensure water flows down over the both sleeve and away from the lamp post column. Each column sleeve 60 may have a respective column sleeve split 63, 63' for configuring, such as by wrapping, the column sleeve around the lamp post column. Most columns have a circular outer perimeter and the column sleeve may be cylindrical in shape. A column flange 70 has a cap flange extension 75 that extends over the top 22 of the lamp post column and a column flange extension 74 that extends down a column flange length 745 over the column sleeve 60. The column flange will direct water flowing off the column cap 80 over the column sleeve 60. A column cap 80 has a post opening 88 for the lamp post 30 to extend therethrough. A post opening is formed by the inner perimeter of the two column cap components 81, shown in FIG. 17. A column cap 80 has a cover extension 82 extending at an extension angle 43 up to the post flange 84, as best shown in FIG. 19. The post flange extends toward the lamp post. The column cap 80 is configured a cap flange-offset distance 712 from the outer perimeter of the column flange or from the column flange extension of the column flange 70, as shown in FIG. 10. The column cap 80 has a plurality of cap feet 90 that extend down and rest on the cap flange extension 75 of the column flange 70 to produce a drainage gap 86 having a drainage gap height 87 for allowing water to flow out over the column flange 70 and over the column sleeve 60, as shown in FIG. 11.

As shown in FIG. 10, the lamp post column 20 is covered by the lamp post column cap system 11. A method of installing the lamp post column cap system includes first configuring the column sleeve 60 around the lamp post column 20 by opening the column sleeve about the column sleeve split 63. Then the column flange is configured around the top 22 of the lamp post column again, by opening the column flange about the column flange split 766. Then the column cap 80 is configured over the column flange by inserting each of the coupling flanges of the two column caps under the opposing column cap component. The column cap components may then be secured by fasteners 38, such as screws 39 into the lamp post column 20. The column cap may have fastener aperture 94 for receiving the fasteners therethrough. The fasteners will extend through the column cap 80, and into the column flange 70. The fasteners may extend into the column and the fasteners may be concrete anchor screws.

As shown in FIG. 11, the column flange 70 has a cap flange extension 75, the portion of the column flange that extends over the top 22 of the lamp post column 20 and rain flange 71 that extends up along an interior perimeter of the column flange. The column flange also has a column flange extension 74 that bends down over the column and over and around the column sleeve 60. As described herein, a fastener may extend through the column cap and into the column flange to secure these two portions of the lamp post column cap assembly 12 together.

Figure 12:
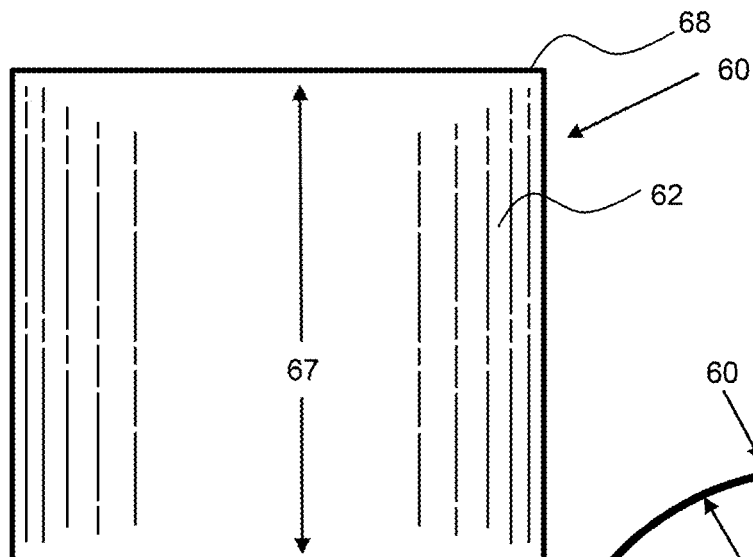
FIG. 12 shows a side view of the column sleeve of the lamp post column cap system.
Figure 13:
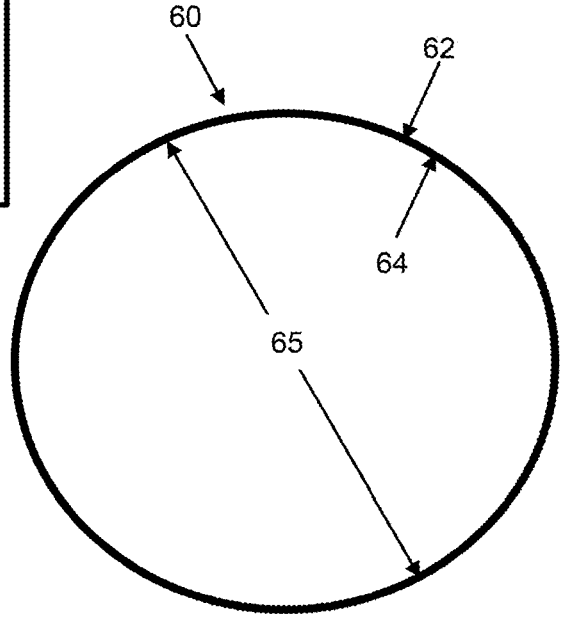
FIG. 13 shows a top view of the column sleeve of the lamp post column cap system.
Figure 14:
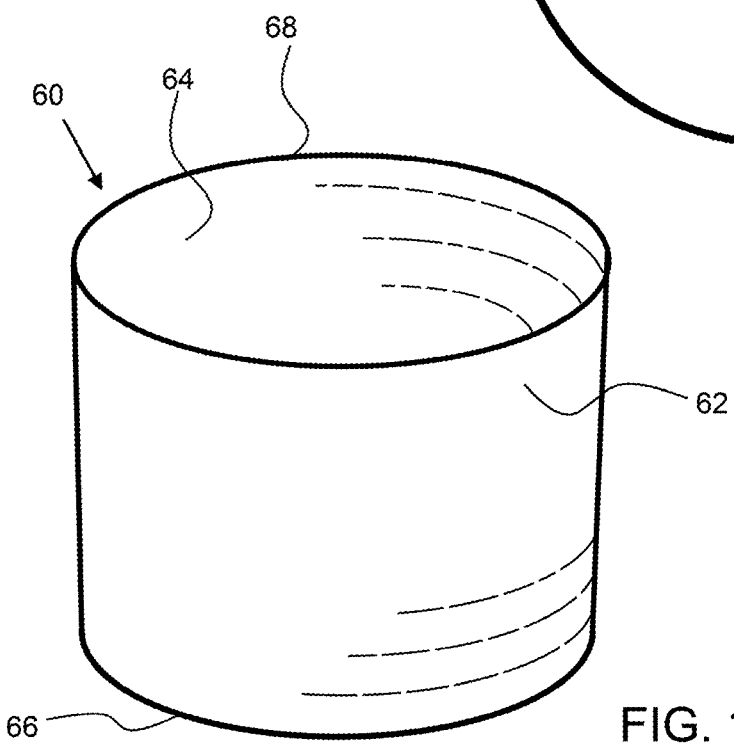
FIG. 14 shows a perspective top view of the column sleeve of the lamp post column cap system.

Referring now to FIGS. 12 to 14, a column sleeve 60 of the lamp post column cap system 11 may be cylindrical in shape to extend around the lamp post column. The column sleeve extends a height 67 from a base 66 to a top 68 and has a diameter 65. The column sleeve 60 has an inside surface 64 configured to extend over the lamp post column and an outside surface 62 configured to be exposed. As described herein a lamp post column may be covered by one, or two or more column sleeves. The column sleeve may have a height that is conducive for shipment and may be on the order of about 30 cm or more, about 35 cm or more, about 40 cm or more, about 50 cm of less and any range between and including the values provided.

Figure 15:
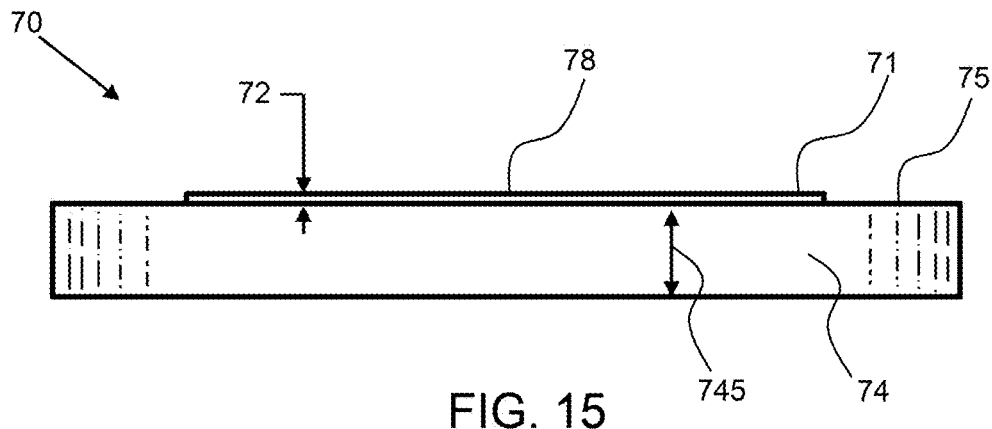
FIG. 15 shows a side view of the column flange of the lamp post column cap system.
Figure 16:
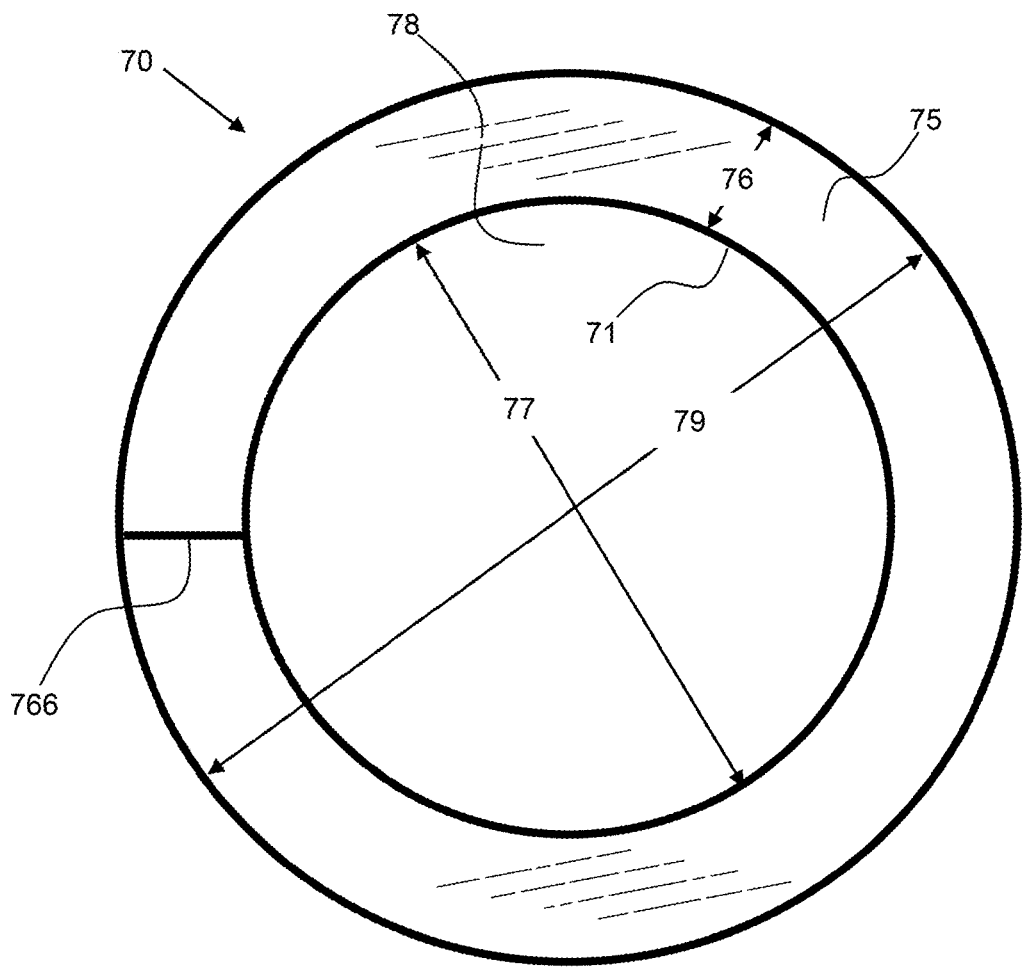
FIG. 16 shows a top view of the column flange of the lamp post column cap system.
Figure 17:
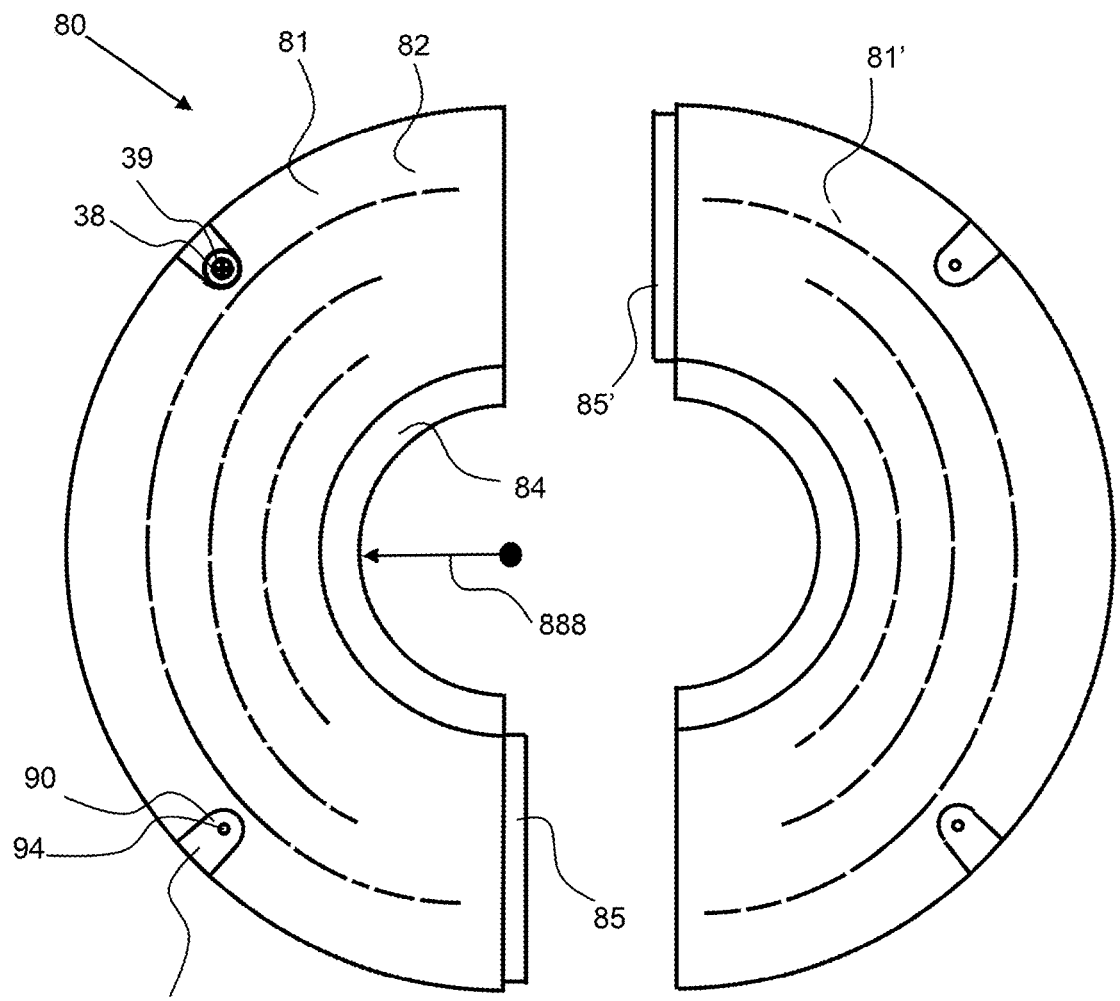
FIG. 17 shows a top view of the column cap of the lamp post column cap system.

Referring now to FIGS. 15 and 16, a column flange 70 has a rain flange 71 that extends up from the cap flange extension 75 and a column flange extension 74 that extends down from the cap flange extension. The rain flange extends up vertically a rain flange height 72 from the cap flange extension, and the cap flange extension extends a cap flange extension length 76 between the rain flange 71 and the column flange extension 74. The column flange has an inside diameter 77 and an outside diameter 79. The column flange forms an aperture 78 and may have a column flange split 766 to enable the column flange to be configured over a lamp post column and around the lamp post.

Figure 18:
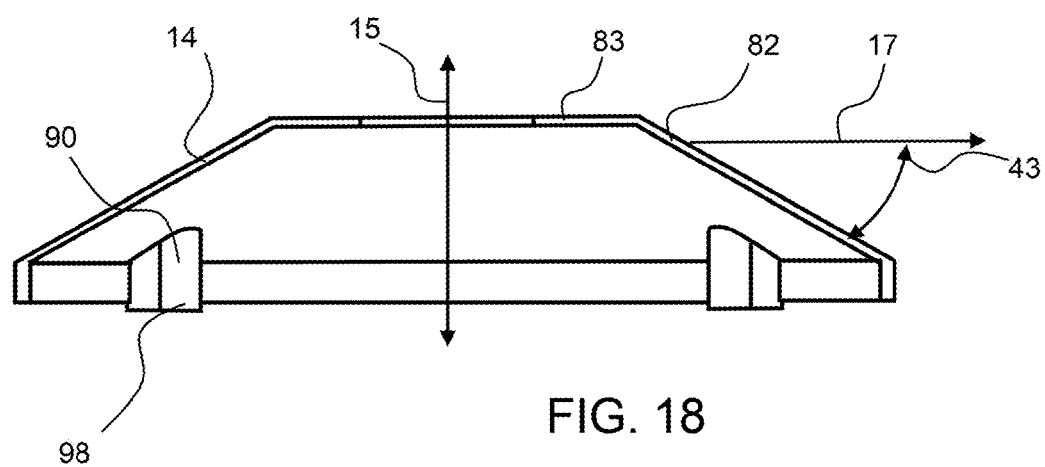
FIG. 18 shows a side cross-sectional view of the column cap of the lamp post column cap system.

Referring now to FIGS. 16 to 19, a column cap 80 of the lamp post column cap system may be configured as two column cap components 81, 81'. The two column cap components may be the same design, having the same shape and features. Each of the column cap components have a coupling flange 85 configured to extend under opposing column cap component to couple together the two column cap components. Each column cap components each extend half a circle or 180 degrees along a radius. Each column cap component has cap feet 90 that extend down to form the drainage gap 86 shown in FIG. 11. A cap foot 90 may include a fastener aperture 94 for receiving a fastener 38, such as a screw 39, therethrough. Also, each cap foot 90 may be formed by a foot recess 92 from the cover extension 82, which enables the column cap component 81 to be molded from a single sheet of material, wherein the column cap component is a contiguous planar sheet of material, such as a plastic sheet 14. The cover extension 82 extends along an extension angle 43 from a horizontal axis 17. A vertical axis 15 is also shown in FIG. 18. A post flange 84 extends along a concave post extension 83 that extends along a radius of curvature 888 that is configured to conform to the lamp post diameter 34 of the post 30 shown in FIG. 1. The foot extension 98 is shown in FIG. 18 and extends a drainage gap height 87 as shown in FIG. 11. The cap foot 90' shown in FIG. 19 shows that the cap foot is a foot recess 92 from the cover extension 82. A column cap may have a drainage flange 89 that extends down from the cover extension 82 along an outer perimeter of the column cap 80.

The terms up and down are with respect to the vertical axis 15 and horizontal axis, wherein the lamp post has a length that extends vertically and the top of the lamp post column usually extends along the horizontal axis. A top of the lamp post column is with respect to the vertical axis.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A system comprising:
  a) a lamp post column having a top;
  b) a lamp post extending vertically from the lamp post column; and
  c) a column cap configured to extend around said lamp post and over said lamp post column, said column cap comprising:
    i) a post opening configured to extend around the lamp post; and
    ii) a cover extension extending at an extension angle of at least 30 degrees for water to flow down over the cover extension;
    iv) cap feet that are configured between the rain flange and the column flange extension:
  d) a column sleeve that extends around the lamp post column;
    wherein the column sleeve further comprises a column sleeve split extending from a base to a top of the column sleeve to enable the column sleeve to be opened about said column sleeve split and configured around the lamp post column; and
  e) a column flange comprising:
    i) a cap flange extension that extends over the top of the lamp post column;
    ii) a column flange split extending across the column flange to enable the column flange to be opened about said column flange split and configured around the lamp post column;
    iii) a column flange extension that extends down along the lamp post column from the cap flange extension;
    wherein the column flange extension extends over the column sleeve; and
    iv) a rain flange extending vertically up from the cap flange extension.

2. The system of claim 1, wherein the column cap is configured a cap flange-offset distance from the column flange extension of the column flange of 30 mm or less.

3. The system of claim 2, wherein the column cap comprises two separate column cap components.

4. The system of claim 3, wherein each column cap component extends between 170 and 190 degrees about the lamp post.

5. The system of claim 4, wherein each column cap component has a coupling flange that extends under the cover extension of an opposing column cap component.

6. The system of claim 5, wherein each of the cap feet are formed by a foot recess from the cover extension.

7. The system of claim 5, wherein each of the cap feet rest on the cap flange extension of the column flange to form a drainage gap height between the cap flange extension of the column flange and the cover extension of the column cap of at least 2 mm.

8. The system of claim 1, wherein the column cap further comprises a column cap split extending across the column cap to enable the column cap to be opened about said column cap split and configured around the lamp post column.

9. A system comprising:
  a) a lamp post column having a top;

b) a lamp post extending vertically from the lamp post column;

c) a column cap configured to extend around said lamp post and over said lamp post column, wherein the column cap comprises two separate column cap components;

wherein the two column cap components form a post opening that extends around the lamp post;

said column cap comprising:

i) a cover extension extending at an extension angle of at least 30 degrees for water to flow down over the cover extension; and ii) cap feet that are configured between a rain flange and a column flange extension;

wherein each of the cap feet rest on the cap flange extension of the column flange to form a drainage gap height between the cap flange extension of the column flange and the cover extension of the column cap of at least 2 mm wherein each column cap component has a coupling flange that extends under the cover extension of an opposing column cap component;

d) a column sleeve that extends around the lamp post column; said column sleeve comprising a column sleeve split extending from a base to a top of the column sleeve to enable the column sleeve to be opened about said column sleeve split and configured around the lamp post column; and e) a column flange comprising:

i) a cap flange extension that extends over the top of the lamp post column;

ii) the column flange extension that extends down from the cap flange extension around the column sleeve;

iii) the rain flange extending vertically up from the cap flange extension; and iv) a column flange split extending across the column flange to enable the column flange to be opened about said column flange split and configured around the lamp post column.

* * * * *